(12) United States Patent
Nelson et al.

(10) Patent No.: US 6,468,572 B2
(45) Date of Patent: Oct. 22, 2002

(54) METHOD FOR FILLING A NUGGET TRANSPORTED ON A CONVEYOR

(75) Inventors: Gregory N. Nelson, Fallbrook, CA (US); Herman D. Mims, Shelby, NC (US)

(73) Assignee: Walton Foods, L.L.C., Battlecreek, MI (US)

( * ) Notice: Subject to any disclaimer, the term of this patent is extended or adjusted under 35 U.S.C. 154(b) by 0 days.

(21) Appl. No.: 09/997,538

(22) Filed: Nov. 29, 2001

(65) Prior Publication Data

US 2002/0117058 A1 Aug. 29, 2002

Related U.S. Application Data

(62) Division of application No. 09/574,999, filed on May 19, 2000, now Pat. No. 6,386,097.
(60) Provisional application No. 60/135,387, filed on May 21, 1999.

(51) Int. Cl.$^7$ .............................................. A21C 15/00
(52) U.S. Cl. ...................... 426/281; 426/282; 426/497; 426/512
(58) Field of Search ................................ 426/281, 282, 426/283, 391, 497, 499, 512, 549; 99/450.6, 450.7, 494

(56) References Cited

U.S. PATENT DOCUMENTS

| 1,643,260 A | 9/1927 | Siegert |
| 1,919,692 A | 7/1933 | Falkendorf |
| 2,567,590 A | 9/1951 | Ashlock, Jr. |
| 3,182,611 A | 5/1965 | Rubenstein |
| 3,538,840 A | 11/1970 | Nelson et al. |
| 3,666,485 A | 5/1972 | Nelson et al. |
| 3,763,765 A | 10/1973 | Nelson et al. |
| 4,162,333 A | 7/1979 | Nelson et al. |
| 4,702,926 A | * 10/1987 | Fowler ........................ 426/512 |
| 4,831,923 A | 5/1989 | Ek |
| 4,880,653 A | 11/1989 | Keller et al. |
| 4,959,235 A | 9/1990 | Aquino et al. |
| 5,000,968 A | 3/1991 | Szwerc et al. |
| 5,069,921 A | 12/1991 | Madanat |
| 5,208,059 A | 5/1993 | Dubowik et al. |
| 5,681,605 A | 10/1997 | Takemori et al. |
| 5,900,265 A | * 5/1999 | Rutherford .................. 426/497 |

* cited by examiner

Primary Examiner—George C. Yeung
(74) Attorney, Agent, or Firm—Akin, Gump, Strauss, Hauer & Feld, L.L.P.

(57) ABSTRACT

A system for filling nuggets transported along a conveyor utilizes a platform that is positioned above the conveyor in a generally parallel fashion. The platform alternatingly moves in either one of a direction substantially similar to the direction of motion of the conveyor, and a direction substantially opposite to the direction of motion of the conveyor. A coring device is mounted onto the platform and used for forming a cavity in the nuggets. A depositing device is mounted on the platform, and is used for introducing a filling into the cavity in the nuggets. The platform is moving, so that the nuggets can be transported by the conveyor, without having to vary the speed of transportation of the nuggets, while either one of a cavity is being formed and the cavity in the nugget is being filled.

9 Claims, 12 Drawing Sheets

STROKE CAM

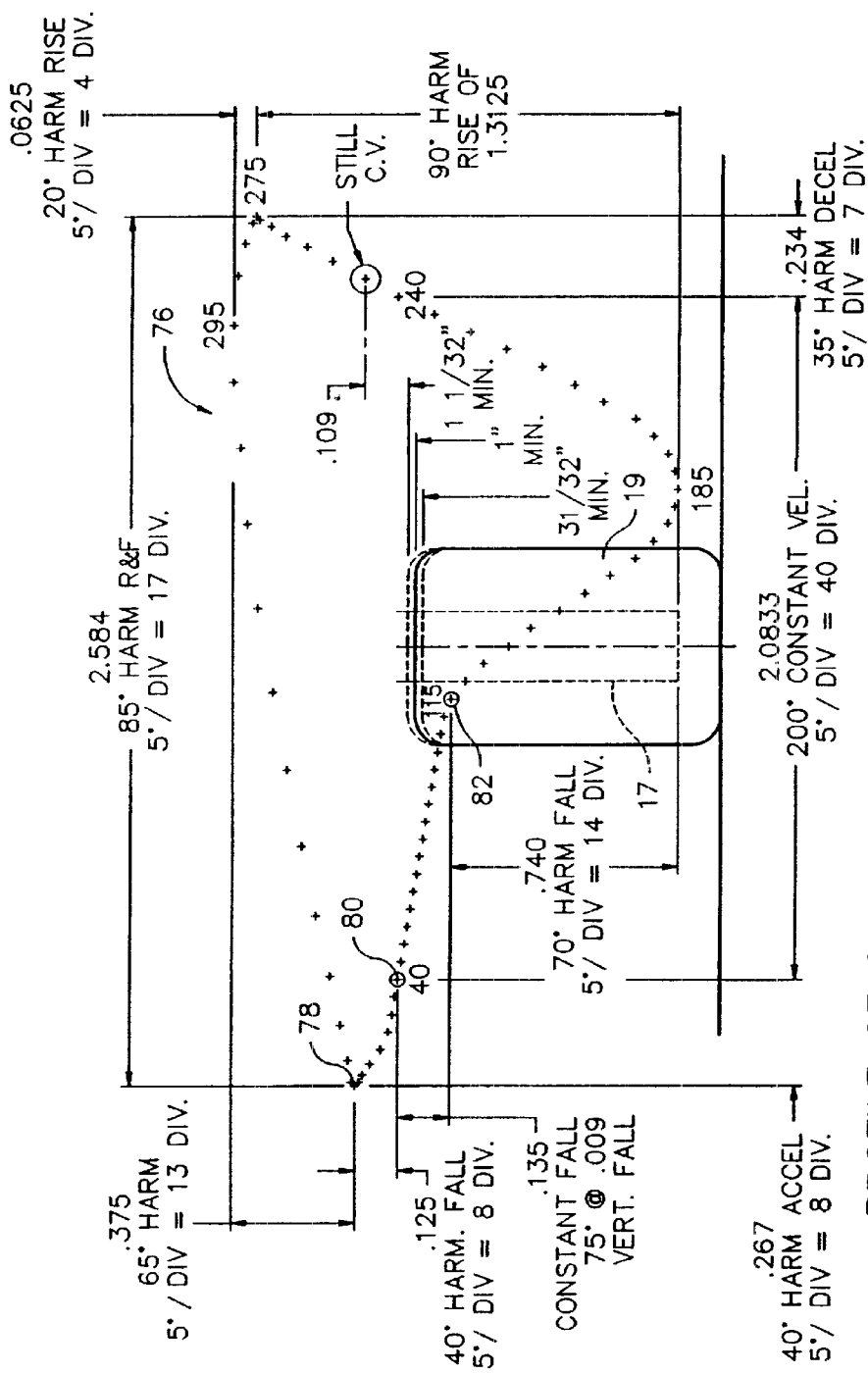

METHOD FOR FILLING A NUGGET TRANSPORTED ON A CONVEYOR

CROSS REFERENCE TO RELATED APPLICATIONS

This is a divisional application of copending U.S. patent application Ser. No. 09/574,999, filed May 19, 2000, now U.S. Pat. No. 6,386,097, which claims priority under 35 U.S.C. §120 from U.S. Provisional Patent Application No. 60/135,387, entitled "System for Filling a Nugget Transported on a Conveyor," filed May 21, 1999 which is hereby incorporated by reference herein in its entirety.

BACKGROUND OF THE INVENTION

The present invention relates to filled confections and, more specifically, to a system and method for filling nuggets transported along a conveyor.

It is a well known practice to pierce a food item having a relatively open and porous interior, such as a creme puff or doughnut, and directly injecting into the food item through the piercing member a thick but flowable filling such as whipped cream, custard, fruit preserves, and jelly. These well-known procedures do not lend themselves to the filling of relatively solid items, and especially the solid and relatively brittle, stick-like, and hard crust items.

Additionally, the apparatus currently used for filling nuggets are unable to fill nuggets without varying the velocity with which the nuggets are being transported. This results in a less efficient production and an increased cost for the produced nuggets.

Most significantly, the systems currently used to fill food products are focused on the co-extrusion and pre-filling of the food products, such as nugget shaped snacks, before baking. Then, the food products are baked at between 325 degrees and 375 degrees Fahrenheit. This causes the filling to become dried out and reduces the quality of the flavor and texture of the filling. Additionally, by injecting the filling prior to baking, the variety of fillings that are suitable for use is reduced.

The present invention overcomes the above problems by providing a system that can fill food products, such as nuggets, after the food products have been baked. Additionally, the present invention uses a platform supported by walking beams that is capable of forming cavities in the nuggets and then filling the nuggets without having to alter the velocity with which the nuggets are being transported along the conveyor. This allows the conveyor to continuously transport nuggets at a constant speed and thus, attain a higher efficiency of nugget filling than otherwise possible. The combination of filling nuggets after baking and continuously transporting the nuggets during the filling process results in a superior tasting nugget, that has a higher quality filling, along with the associated superior taste and texture, being manufactured at a lower cost to the manufacturer.

BRIEF SUMMARY OF THE INVENTION

One embodiment of the present invention is directed to a system for filling a nugget including a conveyor capable of transporting the nugget. A platform is positioned above the conveyor and is capable of alternatingly moving in either one of a first direction, substantially similar to the direction of motion of the conveyor, and a second direction, substantially opposite to the direction of motion of the conveyor. A coring device is mounted on the platform and is capable of forming a cavity in the nugget while the nugget is being transported on the conveyor. A depositing device is mounted on the platform and is capable of introducing a filling into the cavity in the nugget while the nugget is being transported on the conveyor. During the forming of a cavity and the introducing of a filling, the platform moves so that throughout the transportation of the nugget along the conveyor the nugget is transported at a generally constant velocity.

In another embodiment, the present invention is alternatively directed to a system for filling a nugget including a conveyor capable of transporting the nugget. A platform is movably positioned above the conveyor. A coring device is mounted on the platform and is capable of forming a cavity in the nugget while the nugget is being transported by the conveyor. A depositing device is mounted on the platform and is capable of introducing a filling into the cavity in the nugget while the nugget is being transported by the conveyor. During the forming of the cavity and the introducing of the filling, the platform moves so that the nugget can be transported throughout a length of the conveyor without having to vary the speed of transportation of the nugget.

According to another embodiment, the present invention is alternatively directed to a method of filling a plurality of nuggets transported on a conveyor including: moving a coring device and a depositing device above the conveyor in a direction substantially similar to a direction of motion of the conveyor; forming a cavity in at least one of the plurality of nuggets while the plurality of nuggets are transported at a substantially constant velocity along the conveyor; and introducing a filling into the cavity in the at least one of the plurality of nuggets while the plurality of nuggets are transported at the substantially constant velocity.

According to another embodiment, the system of the present invention is alternatively directed to a system for coring a food product including a conveyor capable of transporting the food product. A platform is positioned above the conveyor and is capable of alternatingly moving in either one of a first direction, substantially similar to the direction of motion of the conveyor, and a second direction, substantially opposite to the direction of motion of the conveyor. A coring device is mounted on the platform and is capable of forming a cavity in the food product while the food product is being transported on the conveyor. During the forming of a cavity, the platform moves so that throughout the transportation of the food product along the conveyor the food product is transported at a generally constant velocity.

According to another embodiment, the system of the present invention is alternatively directed to a system for filling a food product including a conveyor capable of transporting the food product. A platform is positioned above the conveyor and is capable of alternatingly moving in either one of a first direction, substantially similar to the direction of motion of the conveyor, and a second direction, substantially opposite to the direction of motion of the conveyor. A depositing device is mounted on the platform and is capable of introducing a filling into a cavity in the food product while the food product is being transported on the conveyor. During the introducing of a filling, the platform moves so that throughout the transportation of the food product along the conveyor the food product is transported at a generally constant velocity.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 12 illustrates the platform movement profile of FIG. 9 with exemplary dimensional values.

DETAILED DESCRIPTION OF THE INVENTION

Figure 1:
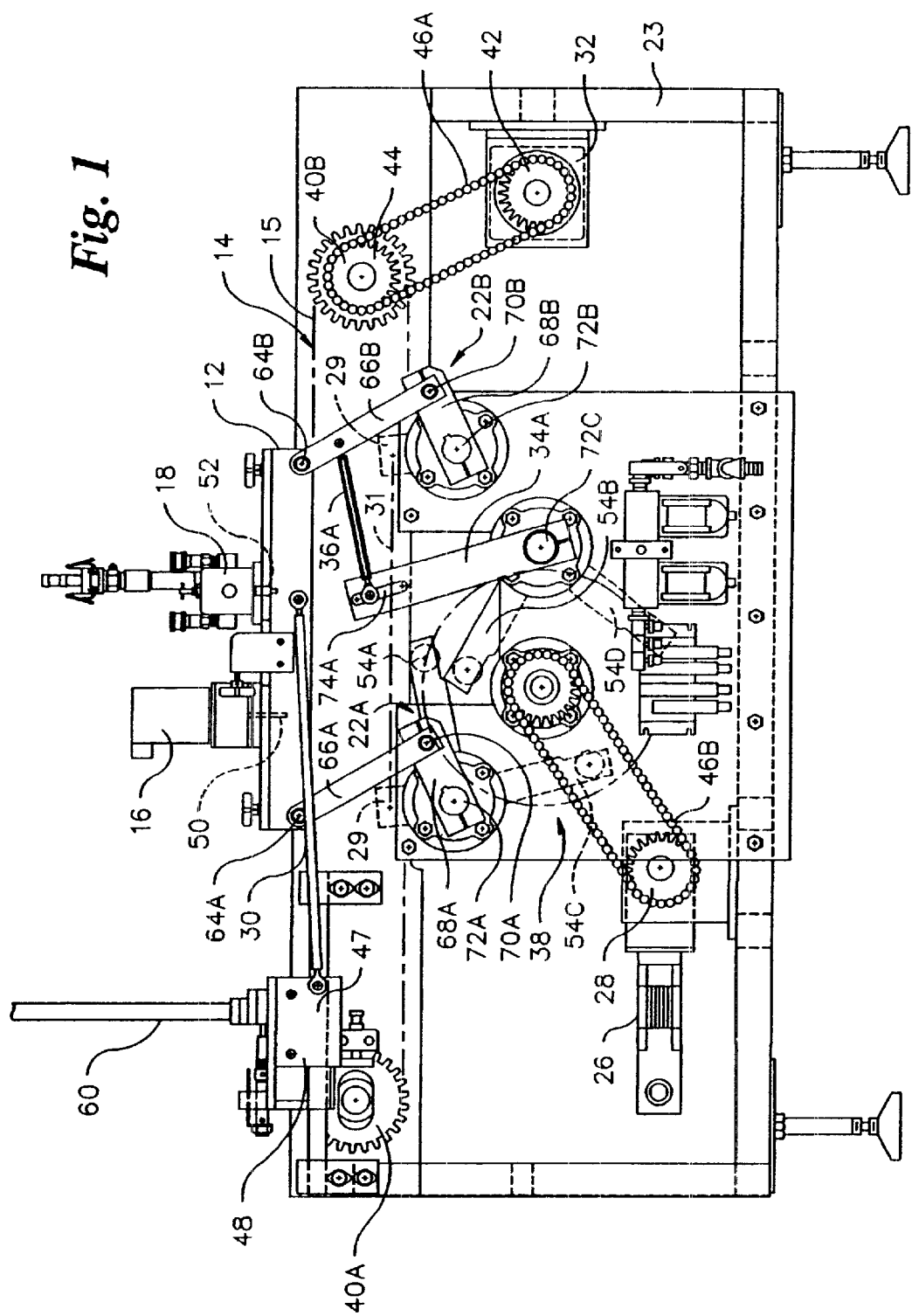
FIG. 1 is a front elevational cross-sectional view of a system for filling a nugget transported on a conveyor according to the present invention.

In the drawings, like numerals are used to indicate like elements throughout. Certain terminology is used in the following description for convenience only, and is not limiting. The words "right," "left," "lower," and "upper" designate directions in the drawings to which reference is made. The words "inwardly" and "outwardly" refer to directions toward and away from, respectively, the geometric center of the system for filling nuggets and designated parts thereof. The terminology includes the words above specifically mentioned, derivatives thereof and words of similar import. Additionally, the word "a," as used in the specification and in the claims, means "at least one."

Referring to FIGS. 1–12, a preferred embodiment of a system for filling a nugget is generally designated 10. Briefly speaking, one embodiment of the system according to the present invention includes a platform 12 movably positioned above the conveyor 14. A coring device 16 is mounted on the platform 12 and is capable of forming a cavity 17 in the nugget 19 while the nugget 19 is being transported by the conveyor 14. A depositing device 18 is mounted on the platform 12 and is capable of introducing a filling into the cavity 17 in the nugget 19 while the nugget 19 is being transported on the conveyor 14. During the forming of the cavity 17 and the introducing of the filling, the platform 12 moves so that the nugget 19 can be transported throughout the length of the conveyor 14 without having to vary the speed of the transportation of the nugget 19. That is, the platform 12 moves so that throughout the transportation of the nugget 19 along the conveyor 12 the nugget 19 is transported at a generally constant velocity.

The present invention is alternatively directed to a method of filling a plurality of nuggets 17 transported on a conveyor 14. Briefly speaking, the method includes moving a coring device 16 and a depositing device 18 above the conveyor 14 in a direction substantially similar to a direction of motion of the conveyor 14; forming a cavity 17 in at least one of the plurality of nuggets 19 while the plurality of nuggets 19 are transported at a substantially constant velocity along the conveyor 14; and introducing a filling into the cavity 17 in the at least one of the plurality of nuggets 19 while the plurality of nuggets 19 are transported at the substantially constant velocity.

While this system 10 is described for use with nuggets, those of ordinary skill in the art will appreciate that the present system 10 can be used with any food products, such as cakes, doughnuts, cookies, breads or the like without departing from the scope of the present invention.

Referring to FIGS. 1–5 and 10–12, many dimensions and measurements are illustrated for example only. Those of ordinary skill in the art will appreciate from this disclosure that the actual dimensions of the system 10 can be varied without departing from the scope of this invention.

It is preferable that two walking beams support each of the front and rear sides of the platform 12. However, not all components referred to in a particular figure may be viewable from the illustrated orientation. Those of ordinary skill in the art will appreciate that the structure of the front and rear sides of the system is preferably, but not necessarily similar. Accordingly, it is only necessary to describe a component on one side of the system to understand how both sides of the system operate.

The system for filling nuggets 10 is preferably, but not necessarily, used in conjunction with the following manufacturing steps. The nugget dough is mixed and cut into appropriate sized pieces according to a predetermined formulation. Then, the nuggets 19 are preferably baked and allowed to cool to about 75–80 degrees Fahrenheit.

After the cooling process, the nuggets 19 are preferably, but not necessarily, sorted and inspected, with the nuggets 19 having unacceptable dimensions being removed, ground up, and possibly remixed with the dough. To accomplish this, the nuggets 19 are preferably transported through a spreading section (not shown) that spreads the nuggets evenly across the conveyor 14 in a one layer deep fashion. Then, the nuggets 19 pass through a sorting section (not shown) that consists of a series of evenly spaced bars (not shown) that let scrap pieces and salt fall through. Thus, only full sized nuggets are able to pass through this section to the inspection section (not shown).

The inspection section is preferably 20 feet long section of the conveyor 14. During the conveyance of the nuggets 19 through the inspection section, any nonuniform nugget pieces are removed.

The remaining nuggets are then preferably, but not necessarily, aligned into rows and transported at a uniform rate by an alignment section (not shown). The alignment section is preferably a 50 feet long section of the conveyor that has 72 V-shaped tray lanes. The V-shaped tray lanes have one 1 and 1 quarter inch diameter centers between the beds, or lanes.

Figure 2:
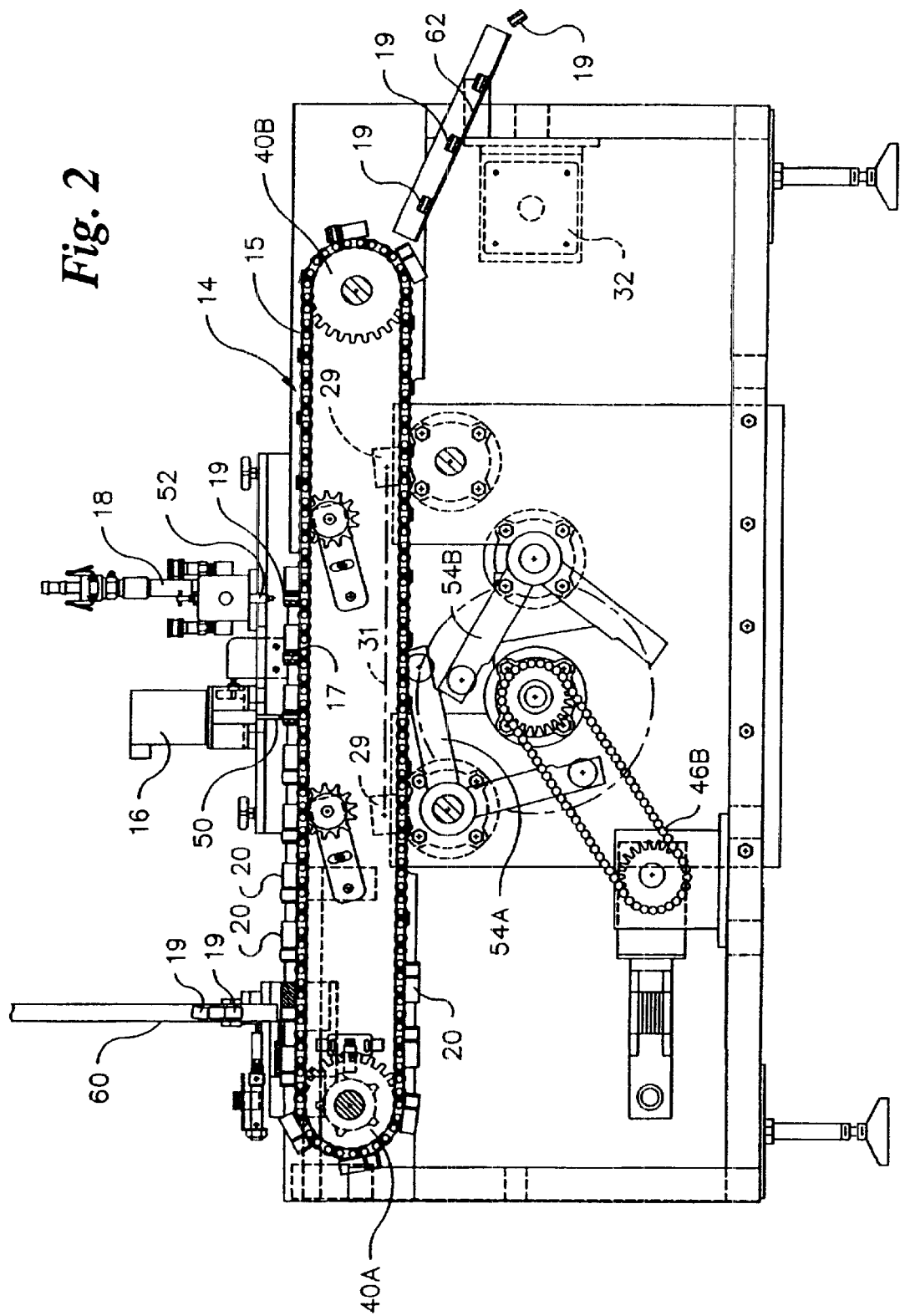
FIG. 2 is a second front side elevational cross-sectional view of the system for filling a nugget of FIG. 1.

The nuggets 19 are then preferably, but not necessarily, transferred into clear ¾ inch diameter tubes that have a length of about 18 inches and are used to load the nuggets 19 into the collets 20. Once the nuggets 19 are loaded into the collets 20, they are transported in the collets 20 along a conveyor 14, as shown in FIG. 2. While the nuggets are preferably being transported at a constant velocity, a cavity 17 is formed in each nugget 19 by a coring device 16. The coring device 16 is mounted on the platform 12 and is capable of forming a cavity 17 in the nugget 19 while the nugget 19 is transported by the conveyor. Then, a depositing device 18 fills the cavity 17 in each nugget 19 with a suitable filling. The depositing device 18 is mounted on the platform 12 and capable of introducing a filling into the cavity 17 in the nugget 19 while the nugget 19 is being transported on the conveyor 14. Thus, due to the design of the system for filling nuggets 10, the nuggets 19 can be filled while being transported on the conveyor 14 at a constant velocity. After the nuggets 19 have been cored and filled, the nuggets 19 are transferred to a packaging conveyor 62.

Then the collets 20 are preferably, but not necessarily, passed through a clear out, or maintenance, section (not shown). In the clear out section the collet 20 is passed over an air jet (not shown) at the same time the nugget 19 passes under a vacuum head (not shown). The air jet forces high pressure air into the collet to remove any product particles which may impede the production process. The ejected particles are then collected by the vacuum head.

While various manufacturing steps have been described in conjunction with use of the system for filling nuggets, those of ordinary skill in the art will appreciate that the system 10 of the present invention can be used alone, or with other manufacturing processes, without departing form the scope of the present invention. Additionally, the system 10 of the present invention can be used to only perform one of the coring or depositing operations without departing from the present invention.

The components and fasteners of the present invention are preferably constructed out of a high strength durable material, such as stainless steel. For convenience only, it should be understood that components of the system for filling nuggets 10 are constructed of stainless steel unless otherwise specified. However, it is understood by those of skill in the art that the present invention can be constructed of other materials, such as alloys, aluminum, steel, and other materials having like properties.

The present invention preferably includes a conveyor 14 capable of transporting the nugget. Those of ordinary skill in the art will appreciate from this disclosure that the conveyor can be a belt conveyor, chain conveyor or the like without departing form the scope of the present invention.

A platform 12 is positioned above the conveyor 14 and alternatingly moves in either one of a direction substantially similar to the direction of motion of the conveyor 14 and a direction substantially opposite to the direction of motion of the conveyor 14. In other words, the system for filling nuggets 10 moves the platform 12 to the right, as viewed in FIG. 1 at a velocity generally matched with that of the conveyed nuggets 19. The coring and filling processes are carried out while the platform 12 is moving in synchronization with the conveyor. After traveling a predetermined distance, the platform 12 reverses direction and moves leftward, as viewed in FIG. 1, to align the platform with a different row 21 of nuggets 19.

The platform 12 is positioned generally parallel to the conveyor 14 during the portion of its movement that is in synchronization with the movement of the collets 20. While the platform is driven in the same direction as the nuggets on the top of the conveyor 14, the distance between the bottom of the platform 12 and the top of the conveyor 14 varies according to the platform 12 movement profile that the cam assembly 38 is designed to generate.

Figure 6:
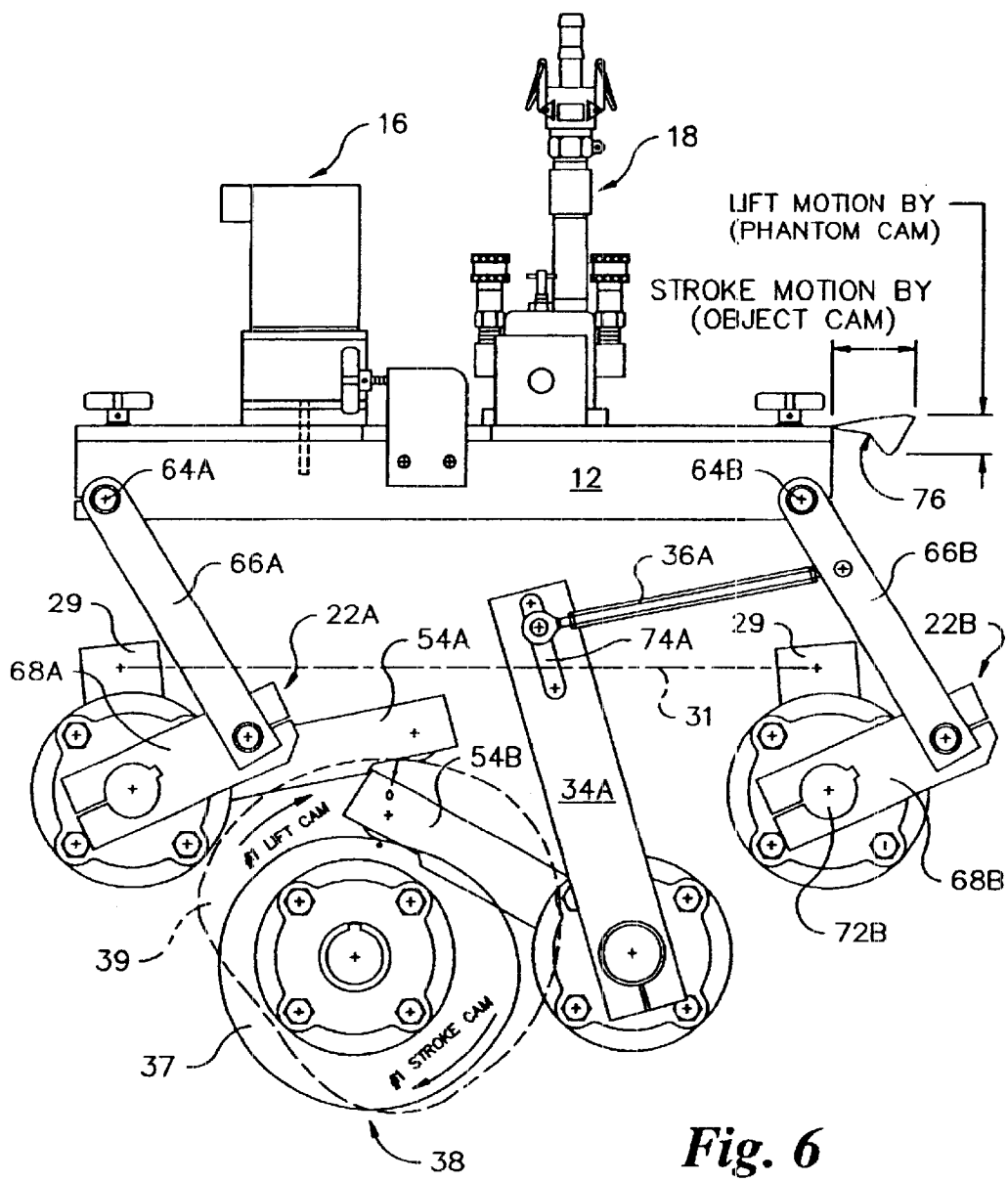
FIG. 6 is a partial front elevational schematic view of the system of FIG. 1 illustrating the connection between a cam assembly, two cam followers, first and second walking beams, a lever, and the platform.
Figure 7:
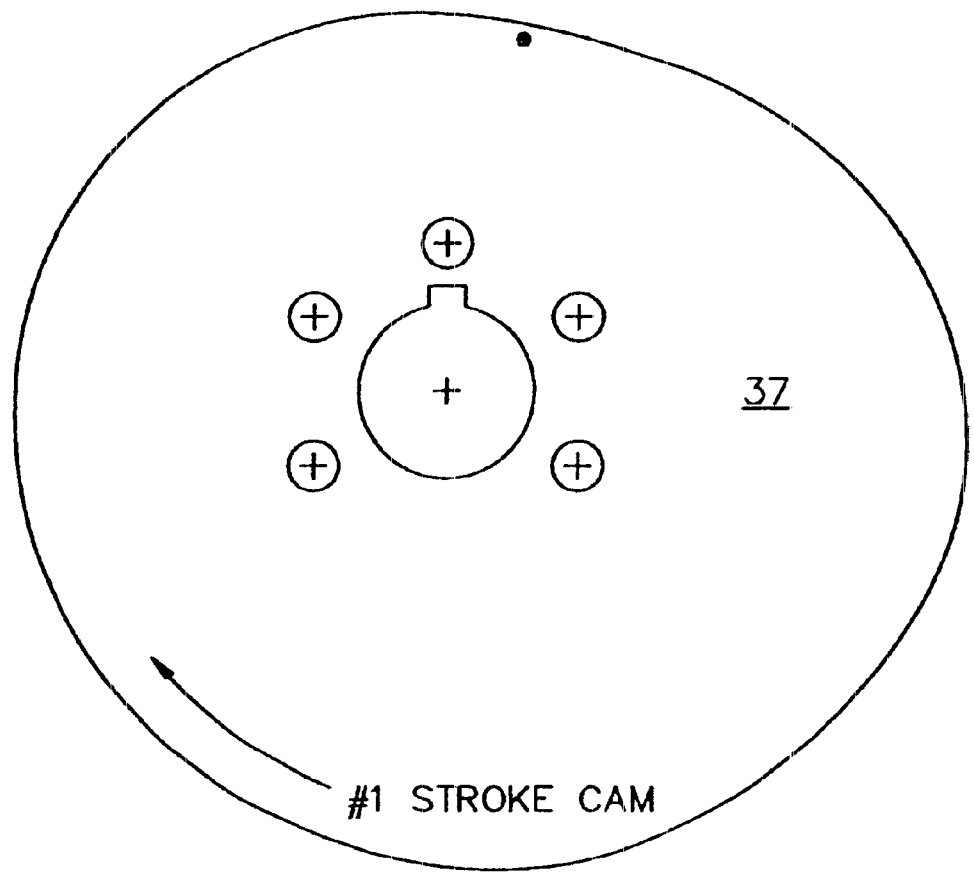
FIG. 7 is a front elevational view of a stroke cam which forms part of the cam assembly of FIG. 6.
Figure 8:
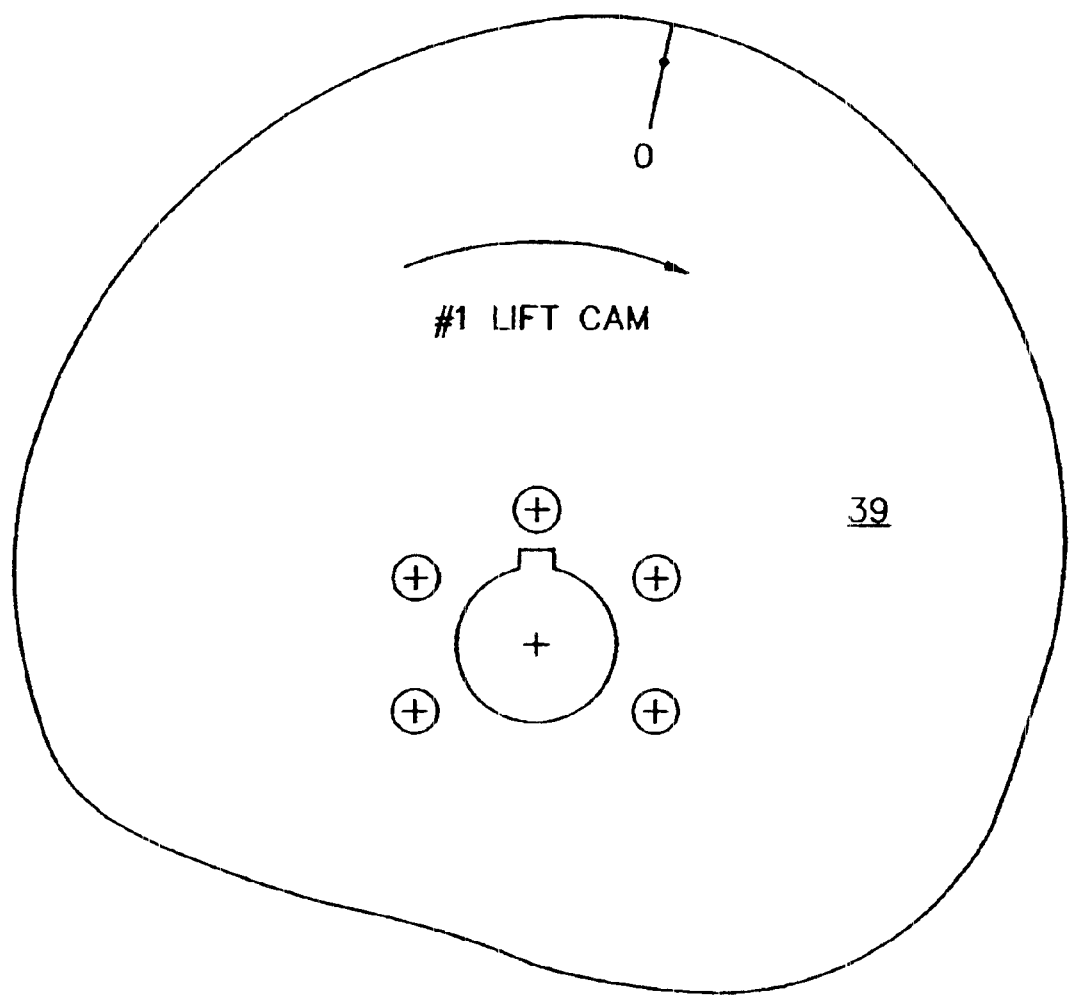
FIG. 8 is a front elevational view of a lift cam which, in combination with the stroke cam of FIG. 7, forms the cam assembly of FIG. 6.
Figure 9:
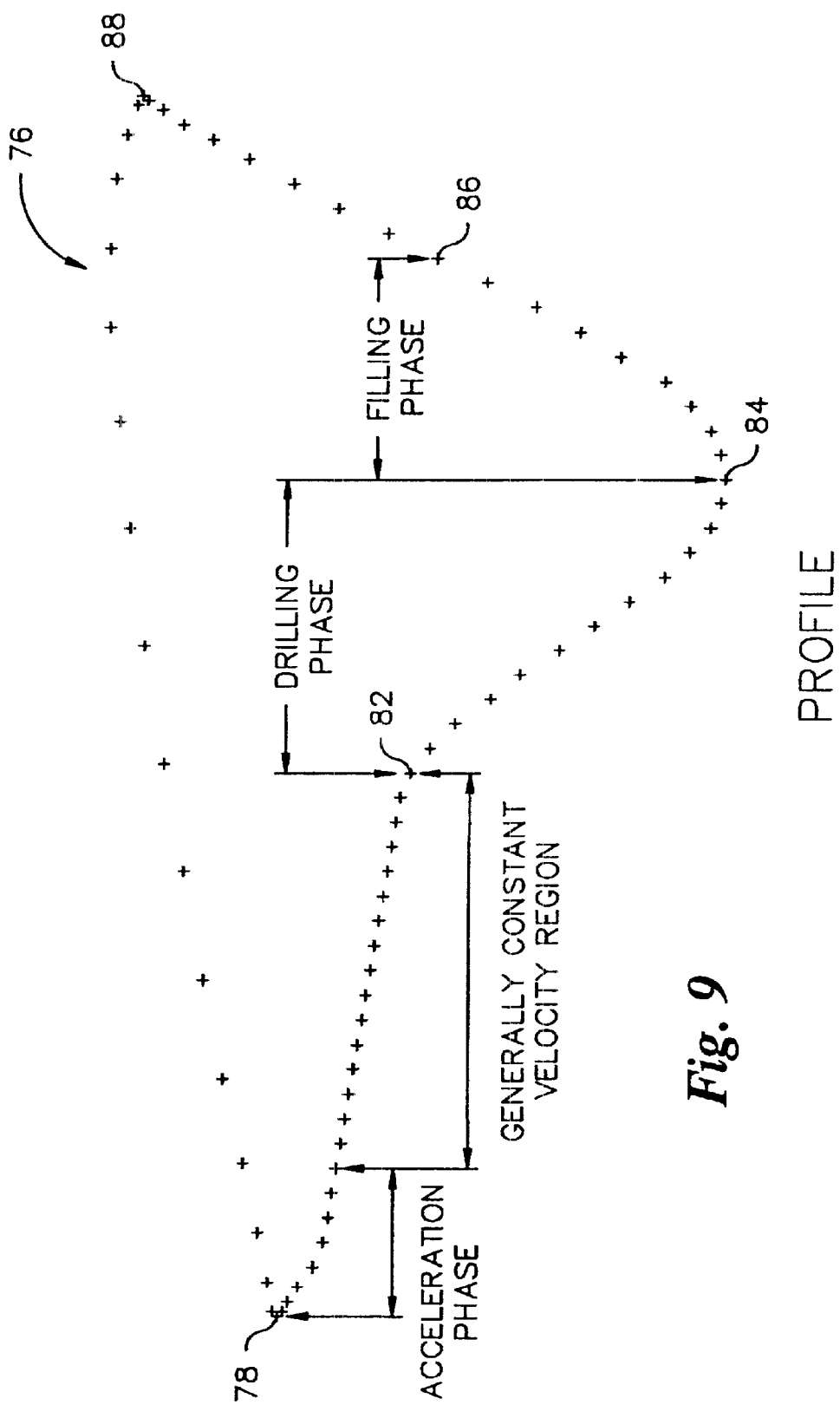
FIG. 9 illustrates a platform motion profile of the platform of FIGS. 1 and 6.
Figure 10:
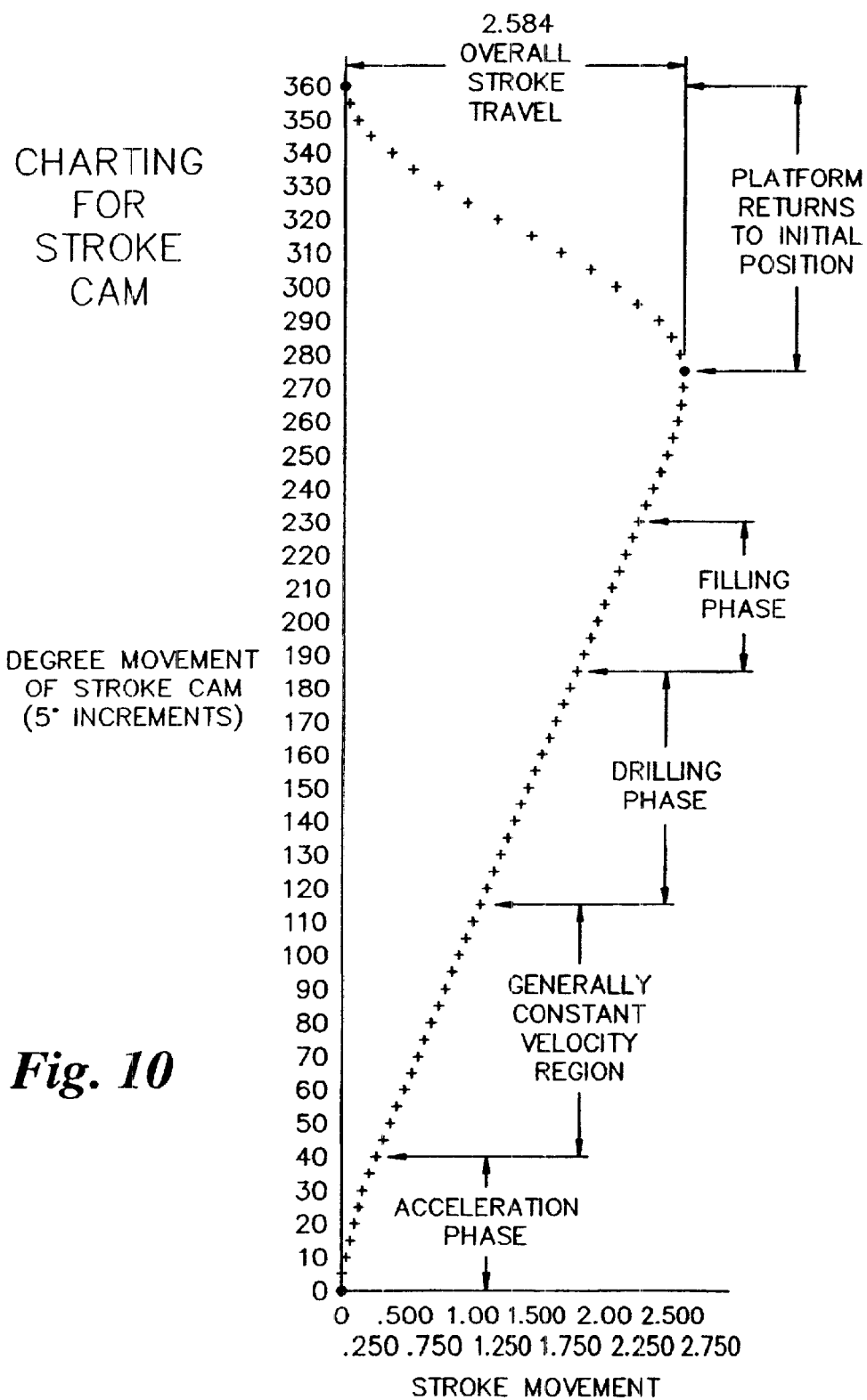
FIG. 10 is a graph illustrating the lateral displacement of the platform depending on the angular orientation of the stroke cam of FIG. 7.
Figure 11:
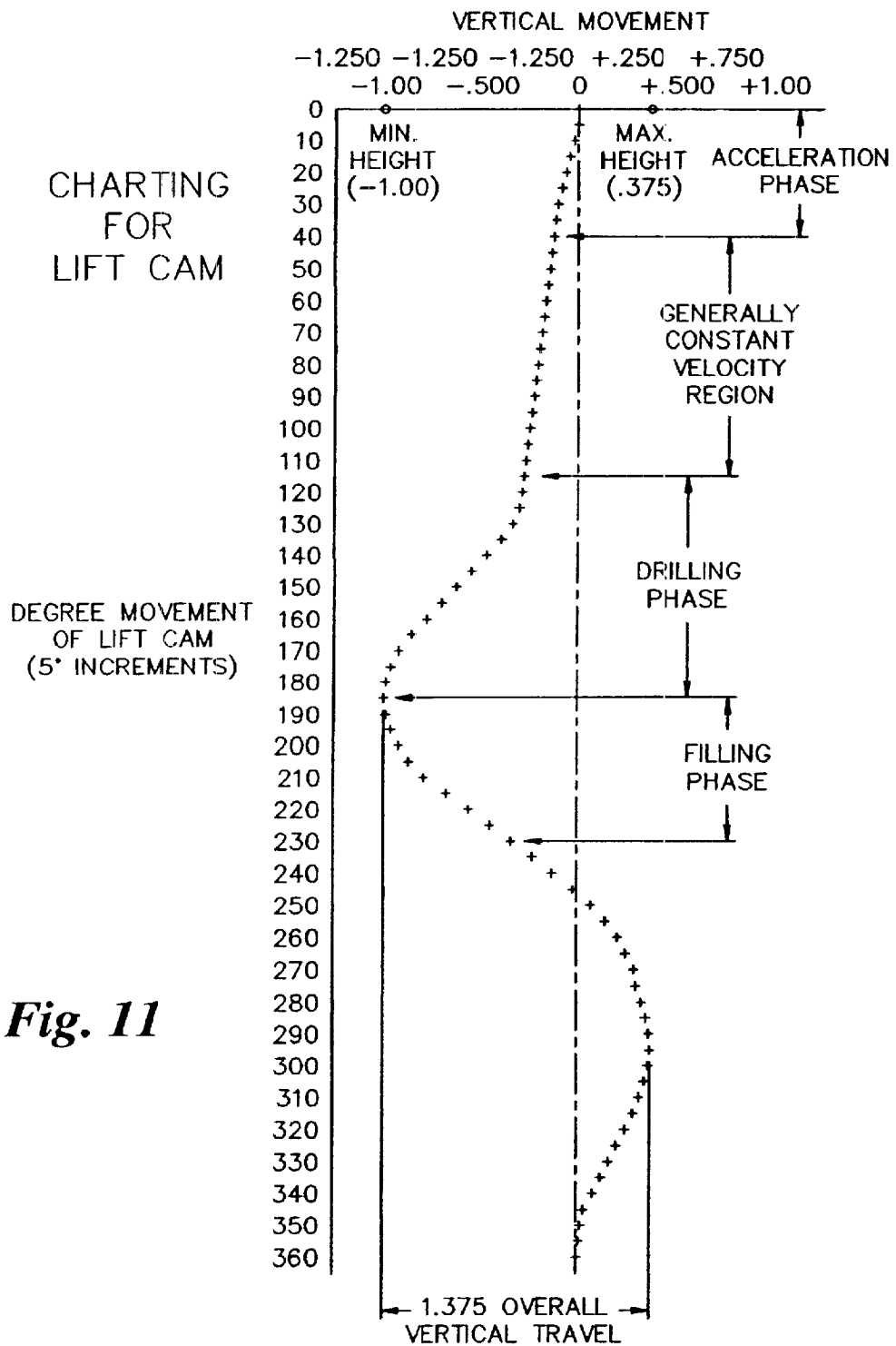
FIG. 11 is a graph illustrating the vertical displacement of the platform relative to a reference position depending on the angular orientation of the lift cam.

While FIGS. 6, 9 and 12 show a preferred platform movement profile 76 (a.k.a. cam profile), those of ordinary skill in the art will appreciate from this disclosure that various cam profiles can be used without departing from the scope of the present invention. Additionally, the particular orientation of the cam assembly 38 during the different phases of the system's operation (further described below) can be varied without departing from the scope of the present invention. Referring to FIGS. 7 and 8, a preferred stroke cam 37 and lift cam 39 are shown, respectively. Referring to FIG. 10, the lateral movement of the platform 12 depending on the angular rotation of the stroke cam 37 is illustrated. Referring to FIG. 11, the vertical position of the platform 12 depending on the rotational position of the lift cam 39 is also shown. Those of ordinary skill in the art will appreciate from this disclosure that the particular movement of the stroke cam 37 and the lift cam 39 depending upon their angular rotation can be varied without departing from the scope of the present invention. Those of ordinary skill in the art will appreciate from this disclosure that the shape of the stroke cam 37 and the lift cam 39 can be varied without departing from the scope of the present invention.

As mentioned above, the platform 12 moves from the left to the right, as viewed in FIG. 1, while generally aligned over a row 21 of collets 20 that are positioned on the upper surface of the conveyor 14. This allows the mechanisms supported by the platform 12 to effectively perform their respective operations on a particular rows 21 of collets 20 while the collets are moving along the conveyor 14. The particular mechanisms, and their associated operations, supported by the platform 12 are described below.

Referring to FIG. 1, a pair of rods 30 (only one of which is shown) are preferably, but not necessarily, attached to the front and rear sides of the platform 12. Each rod 30 is preferably attached at one end to an outer edge of the platform 12. In one embodiment, the rod 30 is connected to the front elevational side of the platform 12 at a point approximately midway along the width of the platform 12. The second end of the rod 30 is preferably attached to a feed housing 48. The feed housing 48 receives the flexible see-through tubes 60 that contain the cooked nuggets 19. The feed housing, or nugget alignment system, 48 is shown in detail in FIG. 5. The pair of rods 30 are preferably pivotally attached to both the platform 12 and the feed housing 48 to cause the feed housing to be substantially in synchronization with the platform 10 with respect to movement in the horizontal direction. The feed housing is not completely in synchronization with the platform 12 because the platform 12 moves in both the horizontal and vertical direction while the feed housing is only adjustable in the horizontal direction. However, the difference in horizontal motion is small because the rods 30 connecting the feed housing to the platform 12 are long enough to avoid having the feed housing 48 over displaced in the horizontal direction due to vertical movement by the platform 12.

Figure 5:
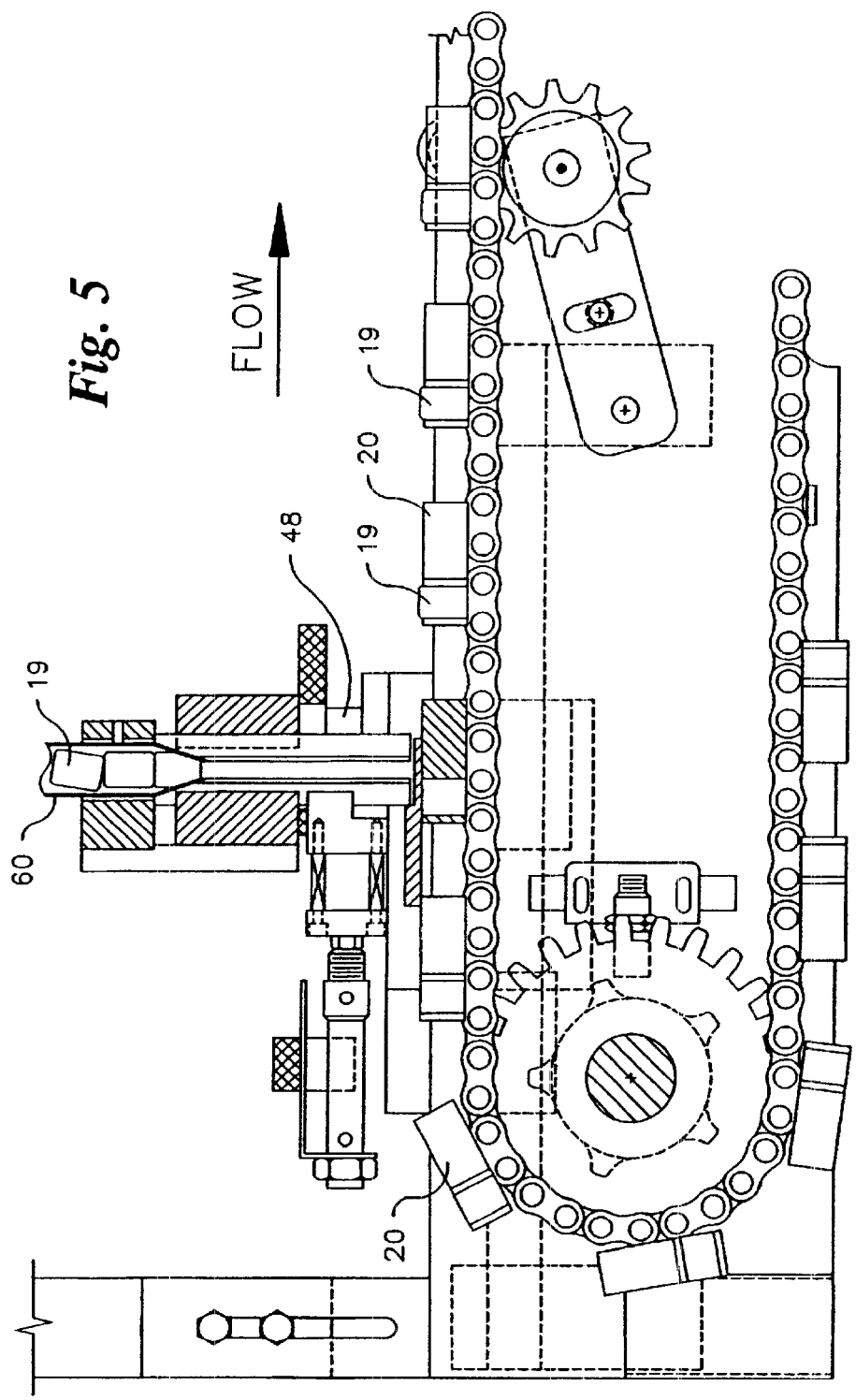
FIG. 5 is a cross-sectional view through the center of the system for filling a nugget of FIG. 1 that illustrates details of the feed housing.

Referring to FIGS. 1 and 5, the nugget alignment system, or feed housing, 48 preferably, but not necessarily, introduces the nugget 19 to the conveyor 14. The nugget alignment system 48 preferably includes a time mechanism for loading the nugget 19 onto the conveyer 14. As further detailed below, at least one collet 20 is preferably attached to the conveyor 14 and is capable of holding the nugget (or other food item) 19. The at least one rod 30 connecting the platform 12 to the nugget alignment system 48 (or to the timing release mechanism) to synchronize the motion of the nugget alignment system (or the timing release mechanism) with the platform 12 to load the nugget 19 into the collet 20. The collet 20 preferably secures the nugget 19 in a predetermined position facilitating the forming of a cavity 17 and facilitating the filling of the cavity 17.

The general correlation of the feed housing 48 with the platform 12 in the horizontal direction enhances the placement of nuggets 19 into the collets 20 from the flexible see-through tubes 60. While the positioning of the platform 12 relative to the collets 20 must be relatively precise to facilitate the proper coring and filling process, the horizontal synchronization between the feed housing 48 and the platform 12 only needs to be precise enough to facilitate the proper filling of the collets 20.

Figure 4:
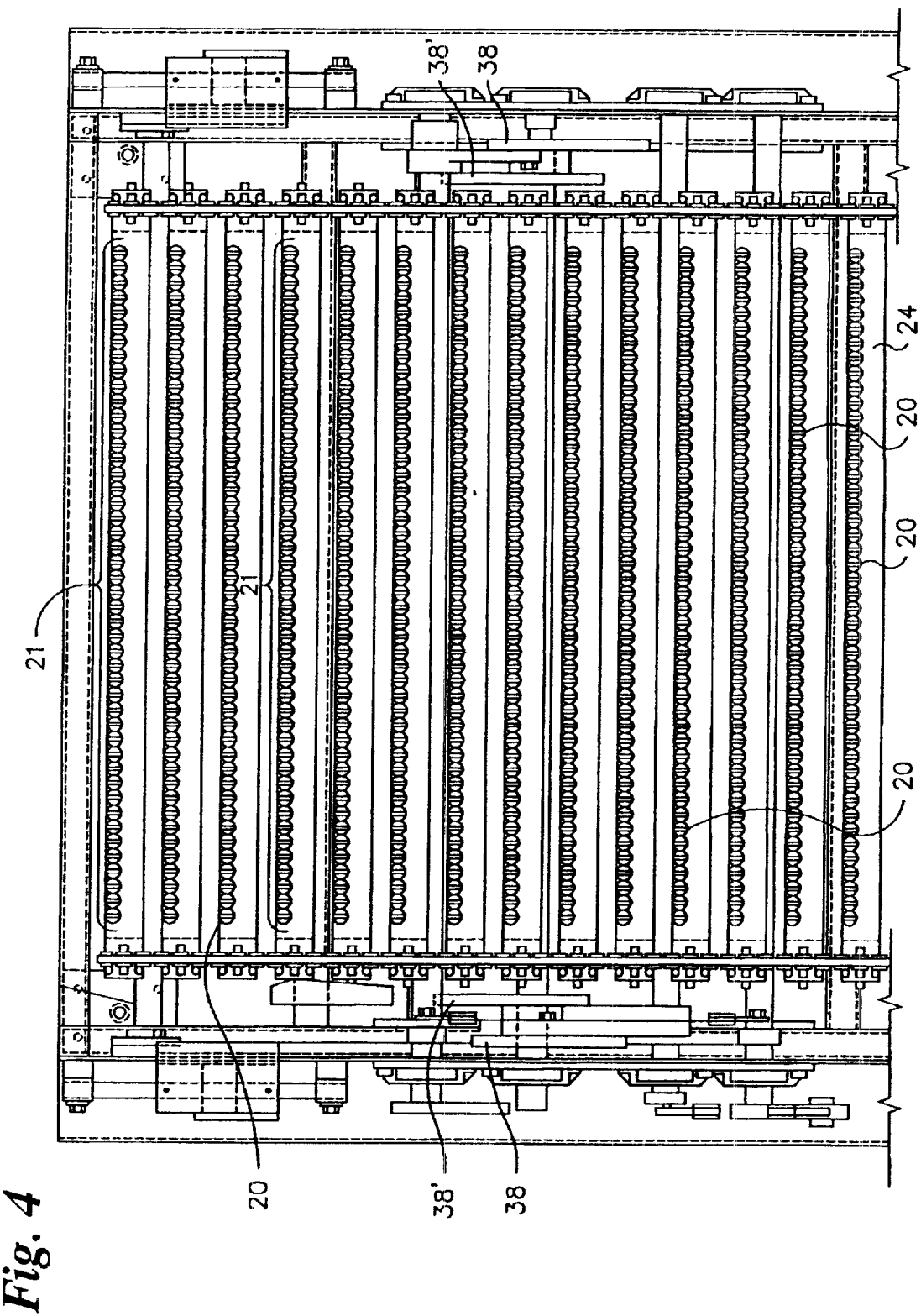
FIG. 4 is a top planar view of a conveyor of the system for filling a nugget of FIG. 1.

As shown in FIGS. 2, the preferred conveyor 14 is an endless-belt conveyor that essentially forms an oblong shape and is engaged at either end with a first and second roller 40A, 40B. In the preferred embodiment each roller has a pair of gears that are aligned with the two chains 15 (both of which are shown in FIG. 4) that are used to convey platens 24. The platens 24 are connected at each end to one of the chains 15 that is used to form the conveyor 14. The method of attaching the platens 24 to the chains 15 is known by those of skill in the art. Consequently, details as to how the platens 24 are connected to the chains 15 are neither necessary nor limiting. While a preferred embodiment of the conveyor 14 has been disclosed, those of skill in the art will understand from this disclosure that the present invention is not limited to any particular type of conveyor 14. One important aspect of the conveyor 14 is that it is capable of transporting nuggets 19 in a fashion similar to that described above.

As described above, the endless conveyor 14 is engaged with and wrapped around the first and second rollers 40A, 40B. The second roller 40B has a coaxially mounted gear 44. The gear 44 is used to receive power that is transmitted via a first chain 46A.

The power to the conveyor 14 is supplied by a conveyor-driving motor 32 that supplies power to a driving gear 42. A cam assembly 38 has a driven gear coaxially attached. The driven gear is driven by the driving gear 42. Thus the driving gear 42 is in communication with the driven gear 44 that is coaxially mounted on the second roller 40B of the conveyor 14.

As the conveyor-driving motor 32 rotates the driving gear 42, the conveyor 14 is driven due to the engagement of the co-axially mounted gear 44 with the second roller 40B. As mentioned above, the conveyor-driving motor 32 drives the conveyor 14 so as to transport the collets 20 on the upper surface of the conveyor 14 in the rightward direction at a constant velocity, as viewed in FIG. 1. The motor 32 can be any one of an internal combustion engine, electric motor or the like without departing from the scope of the present invention. While the preferred embodiment of a driving mechanism has been disclosed, it is understood by those of skill in the art through this disclosure that the present invention is not limited to the particular method of driving the conveyor 14. For example, multiple motors could be used to drive the conveyor 14 or the conveyor driving motor 32 could be attached through a different system of linkages.

Referring to FIG. 6, a first cam follower 54A is preferably coaxially mounted with the first walking beam 22A and is in communication with the cam assembly 38. A second cam follower 54B is coaxially mounted with a lever 34A and is in communication with the cam assembly 38. The second walking beam 22B is preferably connected to the lever 34A via a rod 36A.

Referring to FIG. 4, the conveyor 14 transports rows 21 of nuggets 19 through the system for filling nuggets 10. At least one collet is attached to the conveyor and holds a nugget. Specifically, rows of collets are disposed along the conveyor 14 as shown in FIG. 4. The rows of collets in FIG. 4 preferably extend generally perpendicularly with respect to a direction of motion of the conveyor. Each collet secures a nugget in a predetermined position, facilitating the forming of a cavity and facilitating the filling of the cavity. The collets 20 are each mounted on a platen 24 with each platen supporting one row of collets 20. The nuggets 19 are each held in a collet 20. Before the nuggets are placed in the collets 20, the nuggets are transported through an alignment system (described above) which conveys the nuggets into the flexible, see-through tubes 60 (one of which is shown in FIG. 2), that are used to load the nuggets 19 into collets 20 that are transported along by the continuously moving conveyor. As explained above, the flexible, see-through tubes 60 deliver the nuggets 19 to the feed housing 48 that is moved horizontally by the motion of the platform 12. While a preferred method for loading the nuggets 19 into the collets 20 is disclosed, those of skill in the art will understand through this disclosure that the present invention is not limited to any particular method of loading the nuggets 19 into the collets 20.

A timing release mechanism is used to load the nuggets from the feed housing 48 into the collets 20 while the collets 20 are being continuously moved past the flexible see-through tubes 60. A back-up collet filler (not shown) is provided which includes a plurality of sensors (not shown) to detect when a nugget 19 is missing from a collet 20. When an empty collet 20 is detected, the back-up release mechanism is automatically triggered and any empty collets are automatically filled. The back-up system preferably includes seventy-two rows of tubes that are filled with nuggets 19 and positioned over the collets 20. While a preferred embodiment of the nugget alignment and back-up system have been disclosed, it is understood by those of skill in the art through this disclosure that various methods can be used to properly align the nuggets 19 with the collets 20.

The conveyor transports a plurality of rows (in the preferred embodiment each row is on a platen 24), each containing a predetermined number of nuggets. The preferred number of collets 20 extending across each platen 24 is seventy two. However, it should be understood that the present invention can be constructed with any number of collets by making changes and modifications to the disclosed system for filling nuggets 10 that would be well known to those of skill in the art when contemplated in combination with this disclosure.

A coring device 16 is mounted on the platform 12 in a substantially perpendicular alignment causing the drill heads 50 to extend perpendicularly towards the conveyor 14. The coring device 16 uses drill heads 50 to form cavities 17 in the nuggets 19. The coring device preferably operates on each of the predetermined number of nuggets in one of the plurality of rows simultaneously. While only one end of the coring device 16 is viewable in FIGS. 1–3, the coring device 16 extends lengthwise across the conveyor to traverse the length of the platen 24. The nuggets 19 are clamped in the collets 20, and move, as mentioned above, at a precisely controlled velocity. Once the coring device 16 is properly aligned over the nuggets 19 that are to be cored, the drill heads are brought into contact with the top of the respective nuggets 19. Then the platform 12 is moved gradually closer to the top of the conveyor 14 to cause the drill heads 50 to penetrate the nuggets 19 to the desired depth.

The coring device 16 preferably has multiple drill heads 50 that are aligned perpendicular to the direction of motion of the conveyor 14. This allows the coring device 16 to form cavities 17 in each of the nuggets 19 that are contained in a row 21 of collets 20, which is supported by one platen 24. Accordingly, it is preferred that the coring device 16 have seventy-two drill heads 50, to correlate with the number of preferred collets in a row, that rightward (as viewed in FIG. 1) in a synchronized fashion with the collets 20 as the nuggets 19 are being transported along the endless conveyor 14. Due to the synchronization of the lateral movement of the platform 12 with the lateral movement of the collets 20, the coring device 16 is able to precisely align the drill heads 50 with the nuggets 19 that are secured in the collets 20. Thus, the nuggets 19 are cored while continuously moving along the conveyor 14 without necessitating change in the velocity of transport of the nuggets 19.

The coring device 16 is preferably mounted onto the platform using bolts. However, other suitable fastener mechanisms, such as welds etc. can be employed. The depth to which the cavities are formed by the drill heads 50 depends on the predetermined size of the nuggets 19 and can be varied depending on the actual size of the nugget 19 and the amount of filling that is desired to be placed within the cavity 17. To adjust the amount of the nugget 19 that would be cored by the coring device 16 that cams used by the cam assembly 38, shown in FIGS. 1–4, would have to be changed. However, such adjustments would be within the ambit of those skilled in the art when considered in combination with this disclosure.

Figure 3:
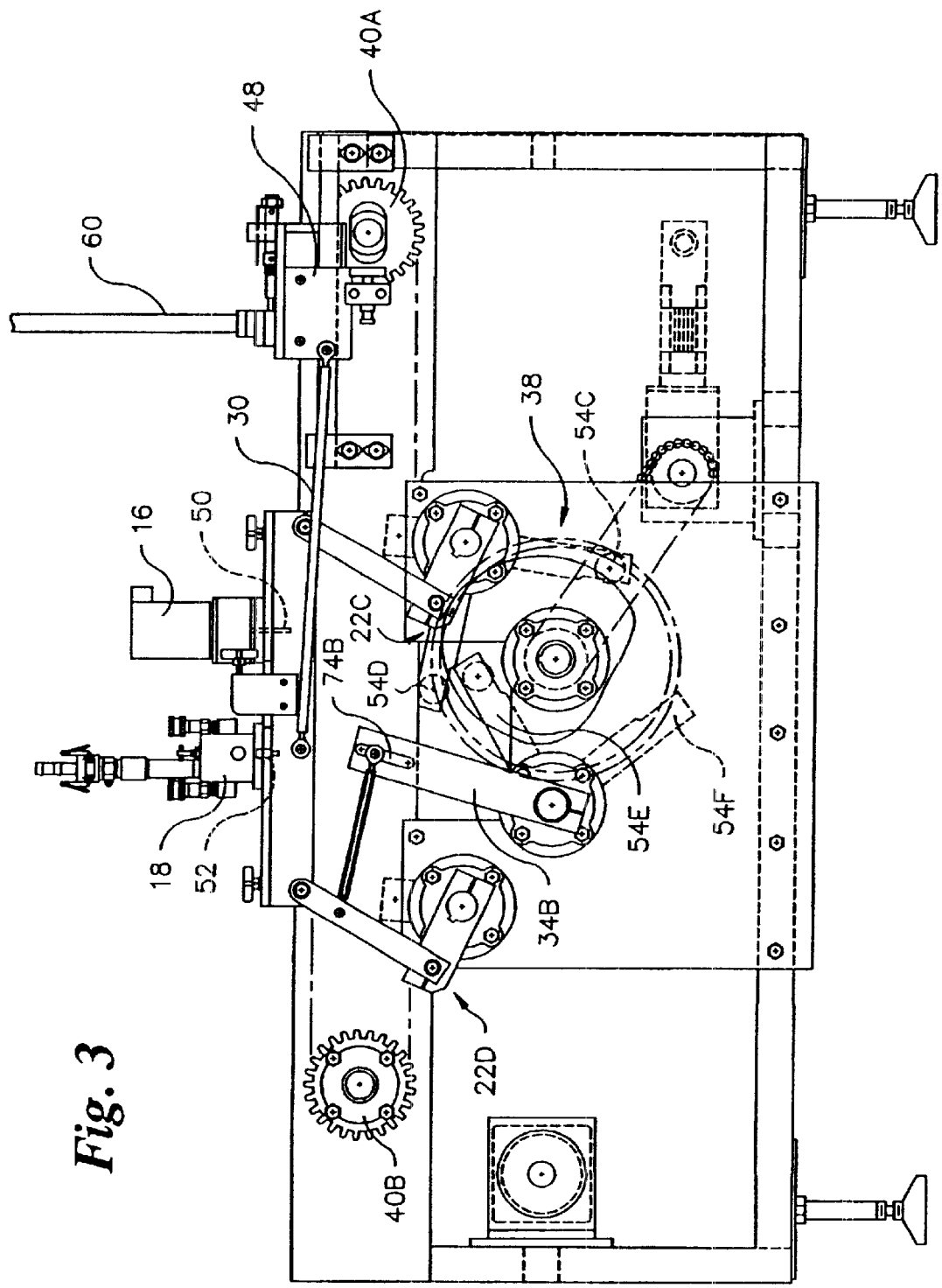
FIG. 3 is a rear side elevational cross-sectional view of the system for filling a nugget of FIG. 1.

A depositing device 18 is mounted on the platform 12 and introduces a filling into the cavity 17 in each nugget 19. The depositing device 18 preferably operates on each of the predetermined number of nuggets 19 in another of the plurality of rows simultaneously. The depositing device 18 is attached to the top side of the platform 12 using bolts (not shown) or other suitable fasteners. Alternatively, the depositing device 18 may be attached to the platform 12 using a suitable weld (not shown). Referring to FIGS. 1–3, the depositing device 18 is generally perpendicularly aligned with the platform 12. Extending from the lower end of the depositing device 18 are a plurality of filling deposit nozzles 52 (only one of which is shown in FIGS. 1–3).

FIG. 2 illustrates the alignment between the depositing device 18 and a collet 20 during the transportation of both the collet 20 and the platform 12 in the rightward direction. When the depositing device 18 is aligned with a nugget 19, that is, braced in the collet 20, the filling deposit nozzle 52 is aligned with the cavity 17 in the nugget 19. Preferably there are 72 filling deposit nozzles, to correlate with the number of collets 20 in each row 21, that are simultaneously operated to fill an entire row 21 of nuggets 17. The filling deposit nozzles form a generally perpendicular angle with the top of the conveyor 14. This facilitates the injection of filling into the cavities 17 of the nuggets 19. While only one side of the depositing device 18 is shown in FIGS. 1–3, the depositing device 18 extends across the distance occupied by the collets 20 that are positioned in one row 21.

The filling is provided to the depositing device 18 from a mixing section (not shown). The mixing section uses an automated filling-preparation system to homogenize the filling to make it uniform and consistent. The mixing station provides the filling to the depositing device 18 which, in turn, injects the filling into the cored nuggets as the nuggets continuously travel along the conveyor. The filling preparation can be aerated in order to increase or decrease the density of the filling. The filling may be any of a creme, a jam, a jelly, peanut butter, cheese, chocolate, taffy, spread, or desirable food filling having a like and similar consistency. Alternatively, a combination of fillings can be used by the depositing device 18.

Multiple depositing devices (not shown) may be used and attached to the platform 12 to allow for a combination of fillings to be placed into the nuggets 19 while keeping the multiple fillings substantially unmixed inside of nugget 19. For example, a combination of chocolate and peanut butter can alternately be placed inside of the nugget to cater to the particular tastes of consumers. The modifications necessary to add additional depositing devices to the platform would be within the ambit of those of ordinary skill in the art when considered in combination with this disclosure.

The preferred size of the nuggets 20 is about one inch in length and having a diameter of five-eighths of an inch. An unfilled nugget has a preferable weight in the range of about 2 and three tenths grams to 2 and five tenths grams, depending on the formulation of the dough. While the preferred size of the nuggets 19 have been disclosed, it is understood by those of skill in the art through this disclosure that the system for filling nuggets 10 can be used with nuggets of any size. For example, nuggets having a shape similar to a small baguette can be used by making modifications that are within the ambit of those of skill in the art when considered in combined with this disclosure.

Conventional pretzel dough is preferred for forming the nuggets 20. Conventional pretzel dough has a favorable shell strength and integral grain structure that facilitates filling. However, those of skill in the art will appreciate that other formulations of dough and other flavors could be used, providing that the resulting nuggets meet the size and strength specifications for which the system for filling nuggets 10 has been designed.

The platform 12 moves so that the nuggets 20 can be transported by the conveyor 14, without having to vary the speed of transportation of the nuggets 20, while either one of the cavity 17 is being formed in the nugget 19, and the cavity 17 is being filled in the nugget 19. This allows the system for filling nuggets 10 to produce filled nuggets 19 at higher speeds. Thus, allowing the production speed to match any oven production capacity.

The platform 12 is moved substantially laterally above the conveyor 14 (but also experiences some motion in the vertical direction) by a first through fourth walking beams 22A–22D (only the first and second walking beams 22A, 22B are shown in FIG. 1). The operation and the connections of the third and fourth walking beams 22C, 22D (shown in FIG. 3) is substantially the same as that of the first and second walking beams 22A, 22B. Accordingly, only the first and second walking beams 22A, 22B will be described and it is understood that the third and fourth walking beams 22C, 22D have substantially the same structure and the operate in substantially the identical fashion.

The first and second walking beams 22A, 22B are connected to a first and second rod 64A, 64B, respectively. A bearing connection between the first and second walking beams 22A, 22B and the first and second rods 64A, 64B is used. The first and second rods 64A, 64B preferably extend entirely through the platform 12 to allow the third and fourth walking beams 22C, 22D to engage the appropriate opposite ends. However, those of skill in the art will understand from this disclosure that other methods of attaching the first through fourth walking beams 22A–22D can be used without departing from the present invention. For instance, four pivots could be placed proximate to the point of engagement between the first through fourth walking beams 22A–22D and the platform 12. Accordingly, the present invention is not limited by any particular method of connecting the first through fourth walking beams 22A–22D to the platform 12.

The first and second walking beams 22A, 22B are comprised of two members that are held in a fixed orientation to each other. The first and second walking beams 22A, 22B have a first and second horizontal lever 66A, 66B that is attached to a respective first and second vertical lever 68A, 68B. The first and second horizontal levers 66A, 66B are responsible for the horizontal motion of the platform 12. The first and second vertical levers 68A, 68B are responsible for the vertical motion of the platform 12. As mentioned above, the third and fourth walking beams 22C, 22D have the same structure as that of the first and second walking beams 22A, 22B.

Short arms 29 are preferably coaxially mounted with each walking beam 22A, 22B. The short arms 29 are preferably attached via a levelling rod 31. By adjusting the leveling rod 31 to change the distance between the free ends of the short arms 29, the platform 12 can be adjusted substantially into a true level position.

A first and second lever 34A, 34B are used to drive the second and fourth walking beams 22B, 22D, respectively. The structure and operation of the first and second levers 34A, 34B is substantially the same. Accordingly, only the structure and operation of the first lever 34A will be discussed, and it is understood that the structure and operation of the second lever 74B is substantially identical. The first lever 34A is pivotally connected at one end about a third shaft 72C.

To synchronize the horizontal movement of the platform 12 with the nuggets 19 that are held in the collets 20, the platform 12 is moved through a profile that starts with the platform 12 positioned relatively leftward along the conveyor 14, as viewed in FIG. 1. Then, the platform 12 is accelerated in the rightward direction until reaching a constant velocity that matches the velocity of the collets 20 on the conveyor 14. As the platform 12 moves rightward, as viewed in FIG. 1, the profile that the platform 12 is moved through gradually brings the bottom surface of the platform 12 closer to the conveyor 14. Thus, the drill heads 50 of the coring device 16 do not extend or retract from the coring device 16, rather, the entire platform 12 descends causing the drill heads 50 to penetrate into the nugget 19. Once the drill heads 50 are approximately three-quarters of an inch into the nugget 19, the platform moves vertically away from the conveyer 14 and returns, by moving in the leftward direction, to its original starting position. The depositing device 18 fills already cored nuggets 19 at the same time as the coring device 16 forms cavities 17 in other nuggets 19.

The profile of the motion of the platform 12 is controlled by the six-bar linkage shown in FIGS. 1 and 3. The six-bar linkage shown in FIG. 1 comprises the frame, the first walking beam 22A, the platform 12, the second walking beam 22B, the first rod 64A, and the first lever 34A. By using a six-bar linkage, the platform 12 can be moved through any profile desired depending on the design of the cams that are used to guide the cam followers 54A–54F, as detailed below. Conjugate cams 38', that are paired with the cam assembly 38 are used to control the motion of the cam followers. The first and second lever 34A, 34B and the first and third walking beams 22A, 22C are each preferably, but not necessarily, connected to their respective set of cams using two cam followers. In other words, each of the first and second lever 34A, 34B and the first and third walking beams 22A, 22C have at least one cam follower on the cam assembly 38. When conjugate cams 38' are used, an additional cam follower (for each of the lever and walking beams) is preferably positioned on the conjugate cams. The use of two cam followers prevents cam jump at higher operating speed and avoids the need for the cam followers having to reverse their orientation during operation. As shown in FIG. 4, a separate set of conjugate cams is located on each side of the system for filling nuggets 10.

As mentioned above, it is preferable, but not necessary, that a separate cam assembly 38 and set of conjugate cams 38' are positioned on opposing sides of the system to each drive one of the levers and one of the walking beams. It is preferable that the cams are paired.

It is understood by those of skill in the art from this disclosure that other linkage designs can be used without departing from the scope of this invention. It is also understood that the stroke cams 37 and the lift cams 39 can be positioned on opposite sides of the system 10 without departing from the scope of the present invention.

The method of filling a plurality of nuggets 19 transported on a conveyor 14 according to the present invention is as follows. Referring to FIG. 1, the method of filling a plurality of nuggets 19 preferably, but not necessarily, includes at least partially cooking the plurality of nuggets 19 prior to forming the cavity 17 in at least one of the plurality of nuggets 19. The method of filling a plurality of nuggets 19, preferably, but not necessarily, also includes the step of feeding the nuggets 19 onto the conveyor 12 using a feeding apparatus, or feed housing, 48 that is attached to the platform 12 by at least one rod 30 to synchronize the motion of the feeding apparatus 48 with the coring device 16 the depositing device 18.

The method of filling a plurality of nuggets 19 preferably includes moving a coring device 16 and a depositing device 18 above the conveyor 12 in a direction substantially similar to a direction of motion of the conveyor 12. The step of moving coring device 16 and the depositing device 18 preferably, but not necessarily, includes moving a platform 12, supporting the coring device 16 and the depositing device 18, in the direction substantially similar to the direction of the motion of the conveyor 12 using a first walking beam 22A and a second walking beam 22B.

The step of moving the platform 12, preferably, but not necessarily, includes moving the platform 12 using a six bar linkage which includes: the frame 23 supporting the first walking beam 22A and the second walking beam 22B; the first walking beam 22A; the second walking beam 22B; a first lever 34A pivotally mounted on the frame 23; and a rod 36A connecting the first lever 34A and the second walking beam 22B. The six bar linkage allows the platform 12 to be moved through a desired profile (as shown in FIGS. 6, 9 and 12) depending on the shape of at least two cams (shown in FIG. 6) 37, 39. Referring to FIG. 6, the moving of the platform preferably, but not necessarily, includes using at least one of the first cam follower 54A and the second cam follower 54B to drive the six bar linkage using the at least two cams 37, 39 which will allow the platform movement to be generally reversed with respect to the direction of motion of the conveyor 12 without having to reverse the motion of the at least two cams 37, 39.

Referring to the upper right portion of FIG. 6, FIG. 9 and FIG. 12, a platform movement profile 76 is shown. The platform movement profile 76 traces the preferred movement of the platform 12 during one cycle of drilling nuggets 19 and filling cavities 17. The platform starts at an initial-position 78 and accelerates to match the speed of the platform 12 with that of the nuggets 19 on the conveyor 14. At the starting-position 78 the cams are oriented at a zero (0) degree angle. The platform accelerates until the velocity-matched-position is reached. At the velocity-matched-position 80, the cams are preferably, but not necessarily, oriented forty (40) degrees from the initial-position 78 as best shown in FIG. 12.

Once the platform 12 has moved along the platform movement profile 76 to the velocity-matched-position 80, the platform 12 preferably moves at a generally constant velocity until reaching the initial-drill-position 82. When the platform 12 is in the initial-drill-position 82, the stroke cam and the lift cam 37, 39 are preferably, but not necessarily, rotated one hundred fifteen (115) degrees from the initial-position 78.

Referring to FIG. 9, after the initial-drill-position 82 is reached by the platform 12, the platform 12 moves toward the conveyor 14 to engage the drill heads of the coring device 16 with the nugget 19. The platform 12 moves toward the conveyor 14 while drilling the cavity 17 into the nugget 19 until the platform reaches the drilling-finished-position 84. When the platform 12 is in the drilling-finished-position 84, the cam assembly 38 is preferably, but not necessarily, rotated approximately one hundred eighty-five (185) degrees from the initial-position 78.

Once the platform 12 is in the drilling-finished-position 84, the platform 12 moves away from the conveyor 14 while filling the cavity 17 positioned in another nugget 19 other than the cavity 17 that was just drilled. The filling preferably, but not necessarily, continues until the platform 12 reaches the filling-finished-position 86. Once the platform 12 has reached the filling-finished-position 86, the platform 12 is more rapidly moved away from the platform 12 until the motion-reversal-position 88 is reached. When the platform 12 is in the motion reversal position 88, the cam assembly 38 is preferably, but not necessarily, rotated about two hundred seventy-five (275) degrees from the initial-position 78.

Once the platform 12 is in the motion-reversal-position 88, the platform 12 accelerates back to the initial-position 78 while the cam assembly 38 rotates between two hundred seventy-five (275) degrees and three hundred sixty (360) degrees.

Referring to FIG. 6, the cam assembly 38 shown can be used to operate the walking beams 22A, 22B on one side of the platform 12. Thus, the system 12 can be operated with one cam assembly 38 positioned on either side of the system 10. Referring to FIG. 6, when only a single cam follower is used for each of the lever 34A and the walking beams, the first and second cam followers 54A, 54B are preferably biased toward the cam to prevent cam jump as is well understood by those of ordinary skill in the art when considered in combination with this disclosure.

While a single cam assembly 38 can be used on either side of the platform 12, it is preferred to use a conjugate cam system as shown in FIG. 4. Referring to FIG. 4, one cam assembly 38 is located on either side of the conveyor 14 and the conjugate cam assembly 38' is located proximate to its neighboring cam assembly 38. Referring to FIG. 1, the first walking beam 22A preferably has a first cam follower 54A and a third cam follower 54C positioned approximately seventy (70) degrees apart. The upper cam follower 54A is positioned as shown in FIG. 6 on the cam assembly 38. The third cam follower 54C is positioned on the conjugate cam assembly 38' located proximate to the cam assembly 38 shown in FIG. 4. By using such conjugate cam assemblies 38' on both sides of the conveyor 14, cam jump can be avoided without biasing the cam followers 54A–54D against the cam assembly 38. While one method of using a conjugate cam assembly 38' with the cam assembly 38 (shown in FIGS. 4 and 6) is disclosed, those of skill in the art will appreciate from this disclosure that other complementary cam systems can be used without departing from the scope of the present invention.

The method of filling nuggets 19 preferably includes the step of forming a cavity 17 in at least one of the plurality of nuggets 19 while the plurality of nuggets 19 are transported at a substantially constant velocity along the conveyor 14. The step of forming a cavity 17 in at least one of the plurality of nuggets 19 preferably, but not necessarily, includes moving the coring device 16 toward the conveyor 14 to engage the coring device 16 with the at least one of the plurality of nuggets 19 while moving the coring device 16 in the direction of the motion of the conveyor 14 to form the cavity 17 in the least one of the plurality of nuggets 19 while the plurality of nuggets 19 are transported at the substantially constant velocity.

The method of filling nuggets according to the present invention preferably includes introducing a filling into the cavity 17 in the at least one of the plurality of nuggets 19 while the plurality of nuggets 19 are transported at the substantially constant velocity. The step of introducing a filling into a cavity preferably, but not necessarily, includes introducing the filling into the cavity in at least one of the plurality of nuggets 19 at substantially the same time as the coring device 16 forms the cavity 17 in at least one other of the plurality of nuggets 19.

The method of filling nuggets according to the present invention preferably, but not necessarily, includes moving the platform in a second direction, generally opposite to the direction of the motion of the conveyor 14 to align the coring device 16 over at least one other of the plurality of nuggets 19 of the conveyor 14.

Thus, to summarize the motion of the platform, the combination of two sets of conjugate cams drives with two sets of paired six linkage connections guides the platform 12 through a profile that allows the nuggets 19 to be cored and filled without having to adjust the velocity of the nuggets 19 during the coring and filling process.

It will be appreciated by those skilled in The art that changes could be made to the above described system for filling nuggets 10 without departing from The broad inventive concept thereof. It is understood, therefore, that this invention is not limited to the particular embodiment disclosed, but it is intended to cover modifications within the spirit and scope of the present invention as defined by the appended claims.

We claim:

1. A method of filling a plurality of nuggets transported on a conveyor, comprising:

moving a coring device and a depositing device above the conveyor in a direction substantially similar to a direction of motion of the conveyor;

forming a cavity in at least one of the plurality of nuggets while the plurality of nuggets are transported at a substantially constant velocity along the conveyor; and introducing a filling into the cavity in the at least one of the plurality of nuggets while the plurality of nuggets are transported at the substantially constant velocity.

2. The method of claim 1, wherein the step of forming a cavity in the device comprises moving the coring device toward the conveyor to engage the coring device with the at least one of the plurality of nuggets while moving the coring device in the direction of the motion of the conveyor to form the cavity in the at least one of the plurality of nuggets while the plurality of nuggets are transported at the substantially constant velocity.

3. The method of claim 2, wherein the step of moving a coring device and a depositing device comprises moving a platform, supporting the coring device and the depositing device, in the direction substantially similar to the direction of the motion of the conveyor using a first walking beam and a second walking beam.

4. The method of claim 3, further comprising the step of moving the platform in a second direction, generally opposite to the direction of motion of the conveyor, to align the coring device over at least one other of the plurality of nuggets on the conveyor.

5. The method of claim 4, further comprising the step of at least partially cooking the plurality of nuggets prior to forming the cavity in at least one of the plurality of nuggets.

6. The method of claim 3, further comprising the step of feeding the nuggets onto the conveyor using a feeding apparatus that is attached to the platform by at least one rod to synchronize the motion of the feeding apparatus with the coring device and the depositing device.

7. The method of claim 3, wherein the step of introducing a filling into a cavity comprises introducing the filling into the cavity in at least one of the plurality of nuggets at substantially the same time as the coring device forms a cavity in at least one other of the plurality of nuggets.

8. The method of claim 3, wherein the step of moving the platform comprises moving the platform using a six-bar linkage comprising:

a frame supporting the first walking beam and the second walking beam;

a first cam follower;

a second cam follower;

a first lever pivotally mounted on the frame; and a rod connecting the first lever and the second walking beam;

the six-bar linkage allowing the platform to be moved through a desired profile depending on a shape of at least two cams.

9. The method of claim 8, wherein the step of moving the platform further comprises using at least one of the first cam follower and the second cam follower to drive the six-bar linkage using the at least two cams to allow the platform movement to be generally reversed with respect to the direction of motion of the conveyor without having to reverse the motion of the at least two cams.

* * * * *